Feb. 28, 1956 J. T. MARVIN 2,736,583
FLUID SEAL
Filed June 21, 1951 2 Sheets-Sheet 1

INVENTOR.
John T. Marvin
BY
his Attorneys

Feb. 28, 1956  J. T. MARVIN  2,736,583
FLUID SEAL

Filed June 21, 1951  2 Sheets-Sheet 2

INVENTOR.
John T. Marvin
BY
his Attorneys

United States Patent Office 2,736,583
Patented Feb. 28, 1956

2,736,583

FLUID SEAL

John T. Marvin, Dayton, Ohio, assignor to General Motors Corporation, Detroit, Mich., a corporation of Delaware Application June 21, 1951, Serial No. 232,734

3 Claims. (Cl. 288—2)

This invention relates to sealing rings and to a method for making such rings.

It is a basic object of the present invention to provide a fluid seal adapted to be used between cylindrical surfaces, such as a shaft and a cylindrical housing therefor for sealing one to the other.

A further object of the invention is to provide a fluid seal consisting essentially of an annulus of rubber-like material having opposed circumferential grooves at the outer surfaces thereof which form a reduced thickness web therebetween, a reinforcing means in the form of a flat washer is provided for the web wherein the washer is set edgewise therein whereby the annulus is freely flexible except for the portions thereof directly in line with the reinforcement. Garter springs are supplied in each of the grooves for sealing the inner surface of the annulus to the shaft or the like.

In carrying out the above object, it is a further object to provide a reinforcing washer having tangs of metal punched therefrom but remaining connected thereto, thereby providing a plurality of equally spaced perforations through the washer and a plurality of outwardly bent tangs associated therewith. These tangs are used as positioning means with respect to the mold during fabrication of the seal wherein the rubber-like material is forced through perforations and embedded therein.

A still further object of the invention is to provide alternately disposed tangs extending from either side of the washer whereby the reinforcing washer may be more positively positioned within the mold.

A still further object of the invention is to provide a method for making a fluid seal of the character described wherein a washer with the tanged positioning means therein is inserted in a mold and then rubber-like material is molded therearound for embedding the washer in the part, said washer being positioned positively with respect to the mold through the engagement of said tangs with the core members used in the formation of the grooves.

Further objects and advantages of the present invention will be apparent from the following description, reference being had to the accompanying drawings, wherein preferred embodiments of the present invention are clearly shown.

It is often desirable to seal a shaft to a housing, such as an axle housing or similar type of construction. For this purpose, garter spring seal rings are usually employed and it has been found that such rings gradually take a permanent set and in many cases, lack strength to remain in position. The present invention is directed to a reinforced seal ring having a double sealing action, which overcomes these drawbacks.

Figure 1:
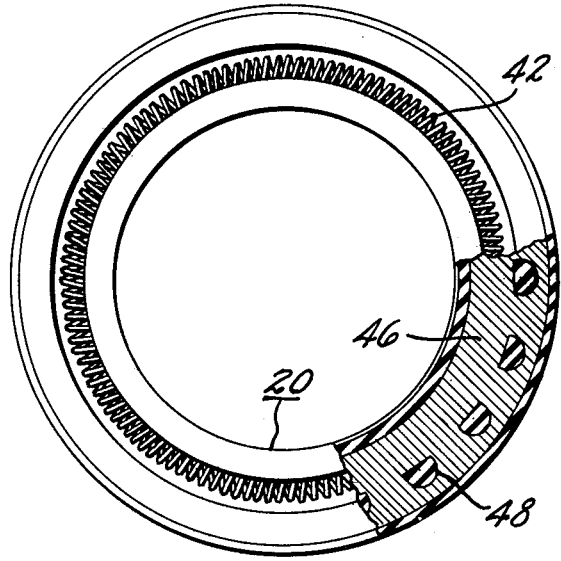
Fig. 1 is a plan view of one side of the seal ring with a portion sectioned to show the reinforcing washer.
Figure 2:
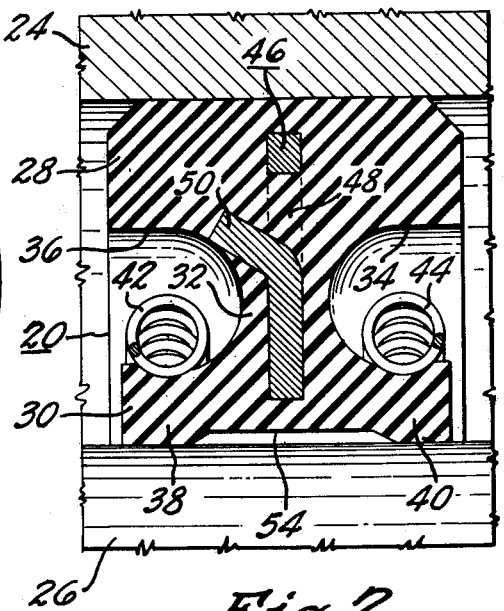
Fig. 2 is an enlarged fragmentary sectional view of a cross section through the seal ring showing its constructional features.
Figure 3:
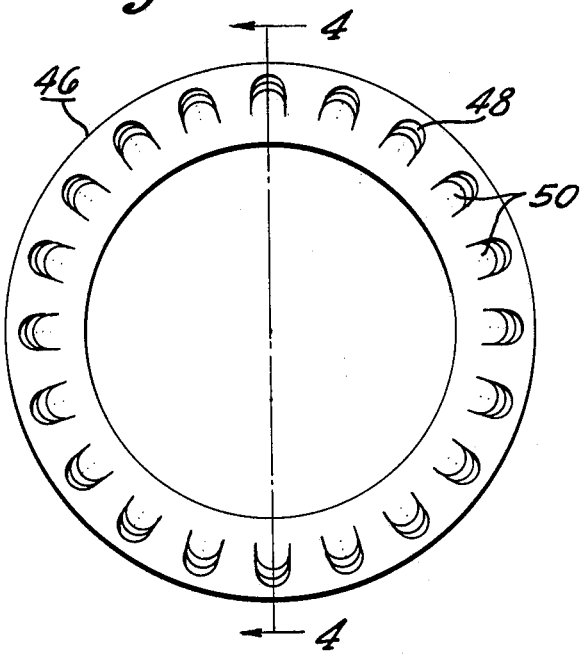
Fig. 3 is a plan view of the reinforcing washer.

Referring specifically to Fig. 1, a plan view of a seal ring 20 is shown with a portion cut away to illustrate the reinforcing washer 46 in position. In Fig. 2, the seal ring 20 is shown in more detail wherein a portion of the ring is depicted in position between a housing 24 and a shaft 26. The ring 20 consists of an outer rim portion 28 and an inner rim portion 30 which is integrally connected by a web 32 of reduced thickness. This forms a pair of oppositely disposed annular grooves 34 and 36. The inner rim 30 is essentially a pair of flanges 38 and 40 attached to the web 32, which flanges are rotated about their connections with the web 32 by means of a pair of garter springs 42 and 44. These springs compress the flanges 38 and 40 inwardly to rotate them downwardly around their connection with the web 32 and therewardly around their connection with the web 32 and thereby force them into sealing engagement with the shaft 26. The entire seal 20 is dimensioned so that the annulus has sufficient thickness to adequately fill the space between the concentric members to be sealed.

Figure 6:
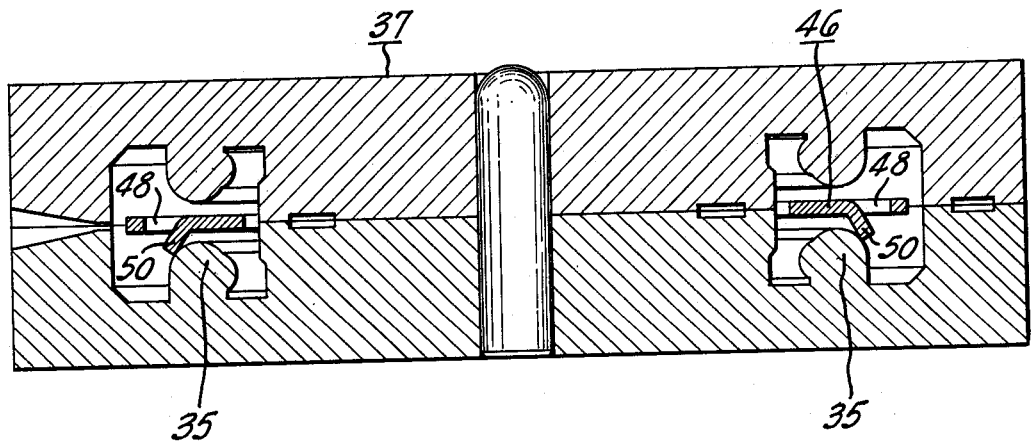
Fig. 6 is a cross sectional view of a mold used in the manufacture of a seal wherein the reinforcing washer has tangs bent in one direction only.

The important factor of this invention is directed to the inclusion of the reinforcing washer 46. This washer is a flat metal member which is set edgewise in the web portion 32 and extends into each of the rim portions a substantial distance and may extend into close proximity with the outer surfaces of the annulus. It is desirable that the ring be dimensioned as shown so that some flexibility or radial compressibility is present. The washer 46 includes a plurality of equally spaced perforations 48 therein which are filled with the rubber-like material of the seal ring whereby the washer 46 is actually embedded in the seal ring. In order to position this washer within the mold, the perforations 48 are formed by merely knocking the material out with a punch press to form a plurality of tangs 50, one of which is preferably present for each perforation 48. These tangs 50 are bent downwardly at an angle of about 45° so that when the seal 20 is being molded, the washer 46 may be set over a core 35 (as shown in Fig. 6) used to form the groove 36 with the tangs 50 setting on the core. In this manner, the rubber-like material may be transfer molded, injected or otherwise filled into the mold 37 under pressure and the washer 46 remains in place with respect to the core 35 during the molding of the seal 20. The pressure on the rubber-like material forces portions of said material through the perforation 48 whereby the washer 46 is actually embedded in the seal.

Figures 4, 5:
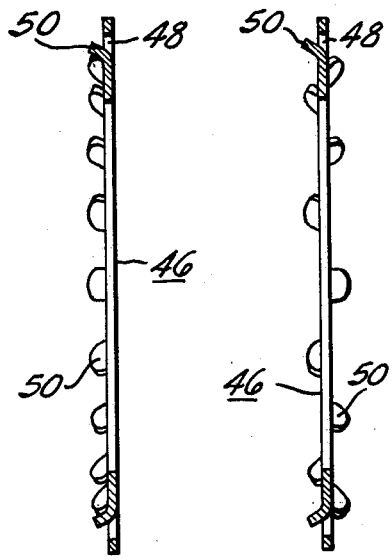
Fig. 4 is a sectional view taken on the line 4—4 of Fig. 3.
Fig. 5 shows a modification of a washer design in Fig. 4 wherein the alternate tangs are bent in opposite directions.
Figure 7:
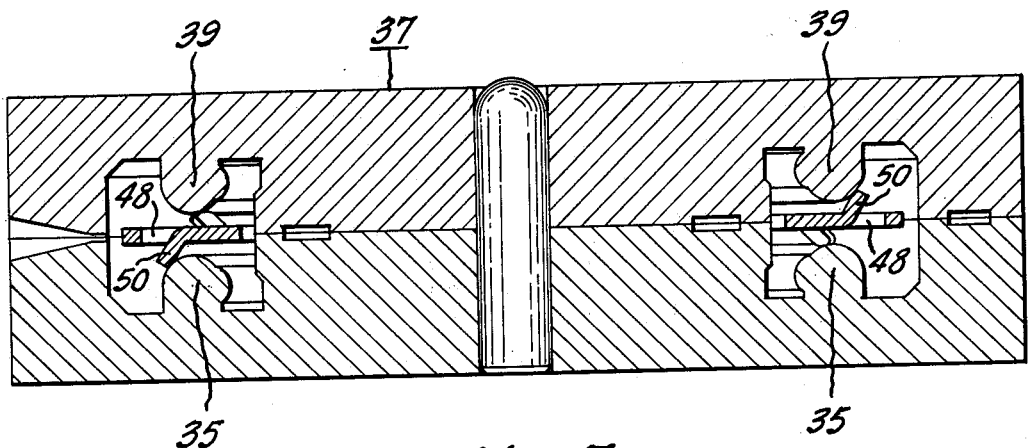
Fig. 7 is a view similar to Fig. 6, wherein a reinforcing washer is shown positioned within the mold, which washer has alternate tangs bent in opposite directions whereby the washer is clamped in the mold between the cores therein.

Two forms of washer may be used, one of which is shown in Fig. 4, wherein all of the tangs 50 are bent in one direction, whereas in the other form, shown in Fig. 5, alternate tangs are bent in opposite directions. In this last form of washer, the tangs fit over each core 35 and 39 (as shown in Fig. 7), namely, the core 39 is used to form the groove 34 and core 35 used to form the groove 36 and thus the washer is positively positioned against any movement. In fact, if the tangs are properly bent, the washer will be spring clamped between the cores if desired through the inherent springiness of the tang metal.

The specific design of the fluid seal as shown is particularly desirable since the flat washer set on its edge as a reinforcing means does not, in any way, destroy flexibility of the material adjacent the grooves 34 and 36. This is true with respect to both the outer rim 28 and the inner rim 30. Other types of reinforcements have been proposed but in each case, the flexibility of the rim sections is greatly reduced due to the extent of the reinforcement which necessarily was large in order to properly position the reinforcement in the mold. By utilizing the tanged positioning means on the washer, it is possible to place the washer in an edgewise position whereby very little flexibility is sacrificed and wherein considerable rigidity is obtained at the central portion of the seal.

Attention is also drawn to the undercut portion 54 on the inner rim 30. This undercut 54 increases the flexibility of the flanges 38 and 40, and improves the sealing effect of the unit to the inner member to be sealed.

The seal 20 is preferably fabricated from any natural or synthetic rubber which is elastic, pliable and deformable and which is resistant to the materials to be sealed. In this connection, natural rubber, synthetic rubber such as copolymers of butadiene-styrene, butadiene-acrylonitrile, polychloroprenes, certain plastics, such as the vinyls, etc., may all be used and may all be broadly classed as rubber-like material for the purposes of claiming this invention. In fact, any moldable material which has sufficient resiliency to provide an adequate seal and which is resistant to the materials to be sealed will be found to be satisfactory.

While the embodiments of the present invention as herein disclosed, constitute preferred forms, it is to be understood that other forms might be adopted.

What is claimed is as follows:

1. A fluid seal for insertion between two concentric cylindrical surfaces, comprising in combination; an outer positioning rim of elastic, deformable material, a flexible inner positioning rim spaced therefrom and of relatively less thickness, a central connecting web between said rims and forming two oppositely disposed circumferential grooves therebetween, a substantially flat, plate-like non-resilient reinforcing washer centrally located edgewise within said web so as to be transversely located with respect to said cylindrical surfaces and extending only partially into said two rims whereby the opposed circumferential outer edges of each rim are unsupported and have a marked degree of compressibility and are capable of flexing relative to said web, said washer having a series of knock-outs therein, each defining a perforation in the washer which is embedded in the material of said web, said knock-outs being bent outwardly from the plane of the washer and extending to the surface of at least one of said grooves, and a pair of garter springs, one of which is disposed in each of said grooves for exerting a radial pressure on the outer edges of the inner positioned rim at either side of said washer for tending to flex said edges radially inwardly.

2. A fluid seal for use between a cylindrical housing and a shaft, comprising in combination; a rubber-like positioning rim, a relatively narrow central web extending radially inwardly from said rim, a pair of oppositely disposed circumferentially extending flanges at the opposite ends of said web, a flat, plate-like reinforcing washer centrally located edgewise within said web so as to be transversely located with respect to said shaft and extending only partially into said rim, whereby the opposed outer circumferential edges of said rim are unsupported and have a marked degree of compressibility and are capable of flexing relative to said web, a plurality of knock-out tangs integrally formed from said washer and alternately bent outwardly to extend from opposite sides of the washer, each tang forming a perforation in the washer and extending alternately to the outer surfaces of said web, said washer stiffening the central portion only of said fluid seal, and spring means for exerting radial pressure on said flanges and adapted to turn said flanges toward each other and about their junction with said web.

3. A fluid seal for insertion between two concentric cylindrical surfaces, comprising in combination; an outer positioning rim of elastic deformable material, a flexible inner positioning rim spaced therefrom, a connected web between said rims and integral therewith, a substantially flat, plate-like non-resilient reinforcing washer located edgewise within said web so as to be transversely disposed with respect to said cylindrical surfaces and centrally located with respect to the outer rim, the outer diameter of said washer being so dimensioned as to extend only partially into said inner and outer rims, the opposed, outer circumferential edges of said two rims being unsupported whereby said opposed outer circumferential edges of said two rims have a marked degree of compressibility and resilience and are capable of being flexed relative to said web, said washer having a series of knock-outs therein, each defining a perforation in the washer which is embedded in the material of the web, said knock-outs being bent outwardly and extending to one surface of said web and garter springs disposed around the outer surface of the inner positioning rim for exerting radial pressure on the outer edges of said rim for tending to flex said edges inwardly.

UNITED STATES PATENTS

References Cited in the file of this patent

| 2,249,141 | Johnson | July 15, 1941 |
| 2,405,279 | Victor | Aug. 6, 1946 |
| 2,437,901 | Winkeljohn | Mar. 16, 1948 |
| 2,483,988 | Victor | Oct. 4, 1949 |

FOREIGN PATENTS

| 544,732 | Great Britain | of 1942 |
| 562,125 | Great Britain | June 19, 1944 |